March 13, 1951 A. WESTFALL ET AL 2,545,326
TROLLING EXTENSION FOR FISHING LINES
Filed Oct. 7, 1947
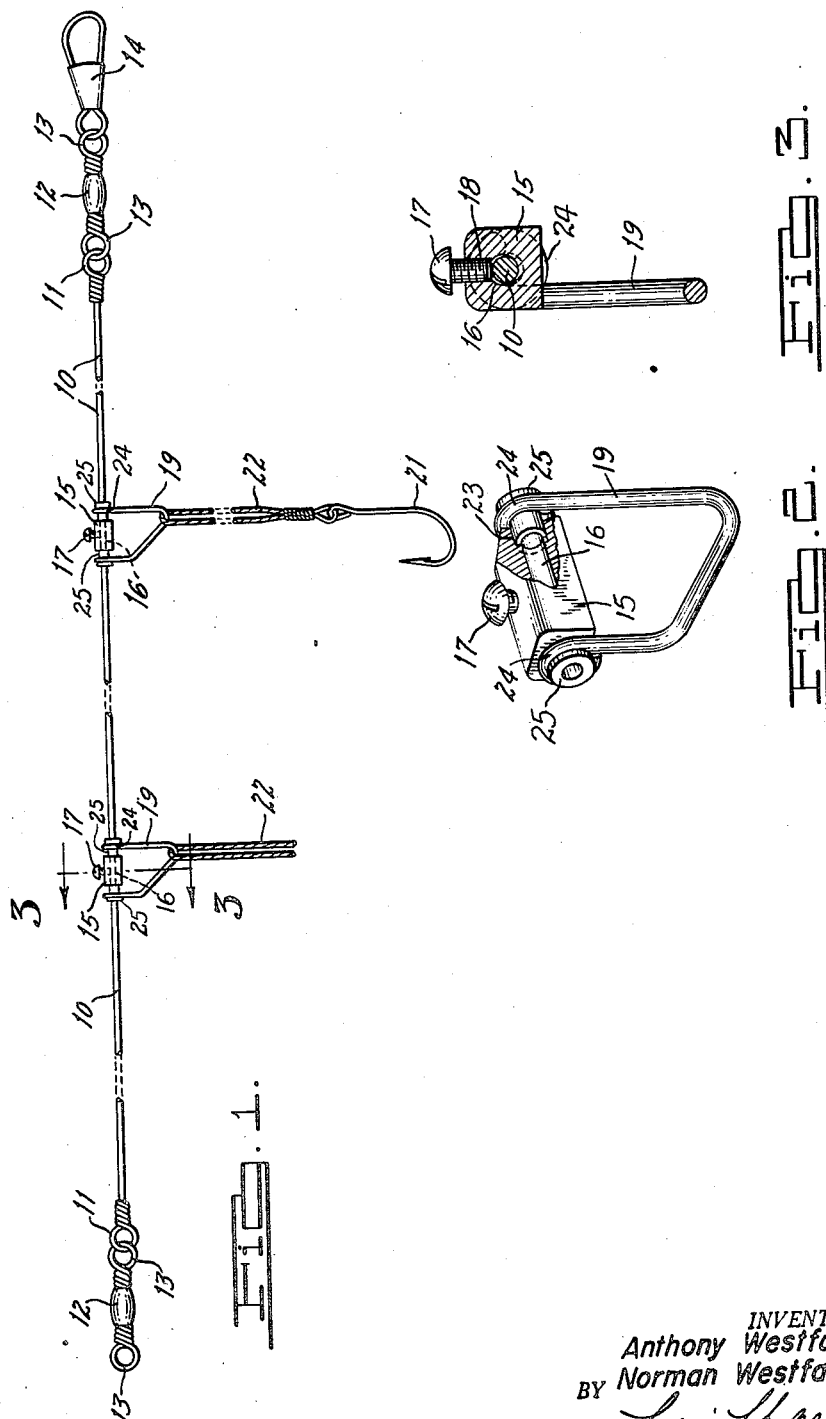
INVENTORS:
Anthony Westfall &
BY Norman Westfall,
ATTORNEY.

Patented Mar. 13, 1951

2,545,326

UNITED STATES PATENT OFFICE 2,545,326

TROLLING EXTENSION FOR FISHING LINES

Anthony Westfall and Norman Westfall,
Detroit, Mich.

Application October 7, 1947, Serial No. 778,322

2 Claims. (Cl. 43—44.85)

Our invention pertains to flexible extensions made of wire or some other suitable material and which may be quickly and easily attached to fish lines, be they commercial or lines used with ordinary sporting fishing outfits.

The object of the invention is to provide an extension of any desired length, to which extension a plurality of fish-hooks on individual leaders may be attached. A further object of my invention is to provide means whereby the individual hooks so attached to the extension may be spaced from each other to any desired distance, thus permitting the hooks to be disposed at graduated levels during fishing. It will be understood that the means used for attachment of individual hooks may be also used for attachment of sinkers, plugs or lures.

We shall now describe our improvement with respect to the accompanying drawings in which:

Figure 1 is a plan view of our trolling extension for fishing lines, it being shown partly broken off, and disclosed with a plurality of sliding blocks, one of which has fishing hook attached thereto by means of a leader.

Fig. 2 is a perspective view, partly broken off, of a sliding block above-mentioned with a suspension member attached thereto.

Figure 3 is a sectional view on line 3—3 of Figure 1.

Similar numerals refer to similar parts throughout the several views.

The extension includes a length of flexible wire 10 terminating with eyes 11 at each end, the eyes being made by looping the respective end and coiling it upon itself as shown. The eyes serve as a convenient means for attachment. By way of an illustration, a swivel 12 is shown affixed to one end of the extension, the swivel being again connected to a snap hook 14, by means of which the extension may be attached to the outer end of a fish line.

Slidingly mounted upon said wire 10, are a number of blocks 15 made substantially in the form of a rectangular prism, each provided with an axial bore 16 of a diameter to fit loosely upon the body of said wire 10. A screw 17, passing laterally through a threaded aperture 18 in the wall of said block, is adapted to bear against said extension, and it is by means of said screw that a tightening contact may be exerted against it. Each block is provided at each end with a cylindrical tube 23 which may be pressed axially into the outer opening of the bore 16 within said block. Each tube is provided at its outer end with a flange 25 as shown. Affixed to said tubes 23 is a suspension member 19. The member is made of wire substantially in the shape of the letter V, the ends of the V formation being loosely looped about the outer walls of the respective tubes 23, as shown by numeral 24, so that said member 19 is in a pivotal relation to block 15. As shown in Fig. 1, a fishing hook 21 attached to a leader 22 may be secured within said V-shaped suspension member.

The operation of our device is quite obvious. It will be understood that there are, ordinarily, a number of sliding blocks on each extension wire. These may be spaced at any desired distance from each other, the spacing may be easily effected by first loosening the screw 17, sliding the block to any particular location upon wire 10, then tightening said screw in an ordinary manner so as to secure said block against longitudinal movement on the wire. In this manner the suspension members 22 with hooks 21 may be properly spaced from each other.

Having described the above improvement, what we wish to claim is as follows:

1. A trolling extension for fishing lines comprising a flexible, wire member, a plurality of short blocks axially bored and strung thereupon in a spaced relation to each other, each block having a cylindrical tube at each end, each tube being flanged outwardly, a wire suspension member forming a loop below the block, the ends of the loop being wound loosely over the respective tubes, and a screw threaded laterally into the block for adjustable frictional contact with said wire member.

2. In combination with a trolling leader, a block axially bored and threaded upon said leader, a laterally disposed screw passing through the wall of the block to bear against the leader for an adjustable frictional contact therewith, the block having a tubular, axial extension inserted into said plug at each end, and a suspension loop under the body of the block, and having its end wound loosely upon the respective tubes for a pivotal connection therewith.

ANTHONY WESTFALL.
NORMAN WESTFALL.

REFERENCES CITED

The following references are of record in the file of this patent:

UNITED STATES PATENTS

| Number | Name | Date |
|---|---|---|
| 344,738 | Hollingsworth et al. | Jan. 29, 1886 |
| 648,360 | Pflueger | Apr. 24, 1900 |
| 1,620,436 | Burmeister | Mar. 8, 1927 |
| 1,636,904 | Elwood | July 26, 1927 |
| 1,837,558 | Lent | Dec. 22, 1931 |
| 1,840,762 | Akervick | Jan. 12, 1932 |
| 2,142,267 | Freeman et al. | Jan. 3, 1939 |
| 2,157,819 | Eckert | May 9, 1939 |
| 2,166,243 | Elvin | July 18, 1939 |
| 2,385,415 | Jackson | Sept. 25, 1945 |